(12) United States Patent
Voiles et al.

(10) Patent No.: US 10,118,688 B2
(45) Date of Patent: Nov. 6, 2018

(54) INHERENTLY BALANCED CONTROL STICK

(71) Applicant: Woodward, Inc., Fort Collins, CO (US)

(72) Inventors: Jeffrey T. Voiles, Niles, IL (US);
Steven E. Rickenbrode, Elmhurst, IL (US); Alexander Ramos, Berwyn, IL (US); Randall E. Gebka, Roselle, IL (US)

(73) Assignee: Woodward, Inc., Fort Collins, CO (US)

( * ) Notice: Subject to any disclaimer, the term of this patent is extended or adjusted under 35 U.S.C. 154(b) by 300 days.

(21) Appl. No.: 14/829,376

(22) Filed: Aug. 18, 2015

(65) Prior Publication Data

US 2017/0050721 A1 Feb. 23, 2017

(51) Int. Cl.
*G05G 9/04* (2006.01)
*B64C 13/10* (2006.01)
*G05G 9/047* (2006.01)
*F16H 19/04* (2006.01)

(52) U.S. Cl.
CPC ............ *B64C 13/10* (2013.01); *F16H 19/04* (2013.01); *G05G 9/047* (2013.01); *G05G 2009/04718* (2013.01); *G05G 2009/04766* (2013.01)

(58) Field of Classification Search
CPC ............... G05G 2009/04766; G05G 9/047
See application file for complete search history.

(56) References Cited

U.S. PATENT DOCUMENTS

| 3,363,480 A | 1/1968 | Murphy |
| 3,523,665 A | 8/1970 | Laynor, Jr. et al. |
| 3,870,161 A * | 3/1975 | Cording ................. B66C 13/56 212/228 |

(Continued)

FOREIGN PATENT DOCUMENTS

| EP | 1259862 B1 | 12/2007 |
| EP | 1797400 B1 | 5/2011 |

(Continued)

OTHER PUBLICATIONS

International Search Report and Written Opinion of the International Searching Authority issued in International Application No. PCT/US2016/047275 dated Dec. 21, 2016; 10 pages.

*Primary Examiner* — William Kelleher
*Assistant Examiner* — Gregory T Prather
(74) *Attorney, Agent, or Firm* — Fish & Richardson P.C.

(57) ABSTRACT

The subject matter of this specification can be embodied in, among other things, a control apparatus includes a first mounting member, an elongate member having a first elongate portion, a second elongate portion, a first axis member between the first elongate portion and the second elongate portion, pivotally mounting the elongate member to the first mounting member and defining a first axis, a track configured as an arc defined about the first axis, and a first feedback assembly supported upon the second elongate portion and providing a first interface device configured to travel along the track in response to movement of the second elongate portion partly about the first axis, wherein the mass of the second elongate portion and the first feedback assembly substantially offsets the mass of the first elongate portion about the first axis member.

9 Claims, 2 Drawing Sheets

(56) References Cited

U.S. PATENT DOCUMENTS

| | | | | |
|---|---|---|---|---|
| 4,513,235 A * | 4/1985 | Acklam | ................ | B60K 26/021 |
| | | | | 244/223 |
| 5,068,498 A * | 11/1991 | Engel | ..................... | H01H 25/04 |
| | | | | 200/6 A |
| 5,473,235 A | 12/1995 | Lance et al. | | |
| 6,437,771 B1 * | 8/2002 | Rosenberg | ............... | A63F 13/06 |
| | | | | 345/156 |
| 6,512,509 B1 | 1/2003 | McVicar | | |
| 6,573,885 B1 | 6/2003 | McVicar | | |
| 6,593,667 B1 * | 7/2003 | Onodera | .................. | G05G 5/06 |
| | | | | 307/10.1 |
| 7,236,157 B2 | 6/2007 | Schena et al. | | |
| 7,658,349 B2 | 2/2010 | Abel et al. | | |
| 7,701,161 B2 | 4/2010 | Hanlon et al. | | |
| 8,056,432 B2 | 11/2011 | Hanlon et al. | | |
| 8,079,281 B2 | 12/2011 | Taylor et al. | | |
| 8,087,619 B2 | 1/2012 | Hanlon et al. | | |
| 8,181,914 B2 | 5/2012 | Kopp | | |
| 8,742,711 B2 | 6/2014 | Hanlon et al. | | |
| 9,889,874 B1 * | 2/2018 | Clause | ..................... | B25J 13/02 |
| 2002/0021282 A1 * | 2/2002 | Masudaya | ............ | B60R 16/005 |
| | | | | 345/156 |
| 2002/0075225 A1 * | 6/2002 | Schena | ................... | A63F 13/06 |
| | | | | 345/156 |
| 2003/0010517 A1 * | 1/2003 | Onodera | ................ | G05G 9/047 |
| | | | | 174/50 |
| 2003/0074089 A1 * | 4/2003 | Onodera | ................ | G05G 9/047 |
| | | | | 700/45 |
| 2003/0098196 A1 * | 5/2003 | Yanaka | .................... | B62D 1/12 |
| | | | | 180/315 |
| 2005/0057031 A1 | 3/2005 | Ahnafield | | |
| 2006/0254377 A1 * | 11/2006 | Henle | ..................... | B64C 13/04 |
| | | | | 74/471 XY |
| 2007/0235594 A1 | 10/2007 | Wingett et al. | | |
| 2008/0099629 A1 | 5/2008 | Abel et al. | | |
| 2008/0111515 A1 | 5/2008 | Larson et al. | | |
| 2008/0156939 A1 | 7/2008 | Hanlon et al. | | |
| 2009/0031840 A1 | 2/2009 | Cowling | | |
| 2009/0229396 A1 | 9/2009 | Taylor et al. | | |
| 2010/0032255 A1 * | 2/2010 | Conti | ....................... | G05G 5/03 |
| | | | | 188/272 |
| 2010/0071496 A1 | 3/2010 | Hanlon et al. | | |
| 2011/0148666 A1 | 6/2011 | Hanlon et al. | | |
| 2013/0074631 A1 | 3/2013 | Hanlon et al. | | |
| 2014/0014781 A1 | 1/2014 | Hanlon et al. | | |
| 2014/0208881 A1 * | 7/2014 | Voiles | ..................... | B64C 13/04 |
| | | | | 74/471 XY |
| 2014/0274398 A1 * | 9/2014 | Grant | ..................... | G06F 3/0338 |
| | | | | 463/37 |
| 2016/0357216 A1 * | 12/2016 | White | ...................... | B64C 13/10 |
| 2017/0050721 A1 * | 2/2017 | Voiles | ..................... | G05G 9/047 |
| 2017/0203206 A1 * | 7/2017 | Grant | ..................... | A63F 13/285 |
| 2017/0212514 A1 * | 7/2017 | Taylor | .................. | G05D 1/0077 |

FOREIGN PATENT DOCUMENTS

| | | |
|---|---|---|
| EP | 2076432 B1 | 6/2012 |
| WO | WO 01/65328 | 9/2001 |

* cited by examiner

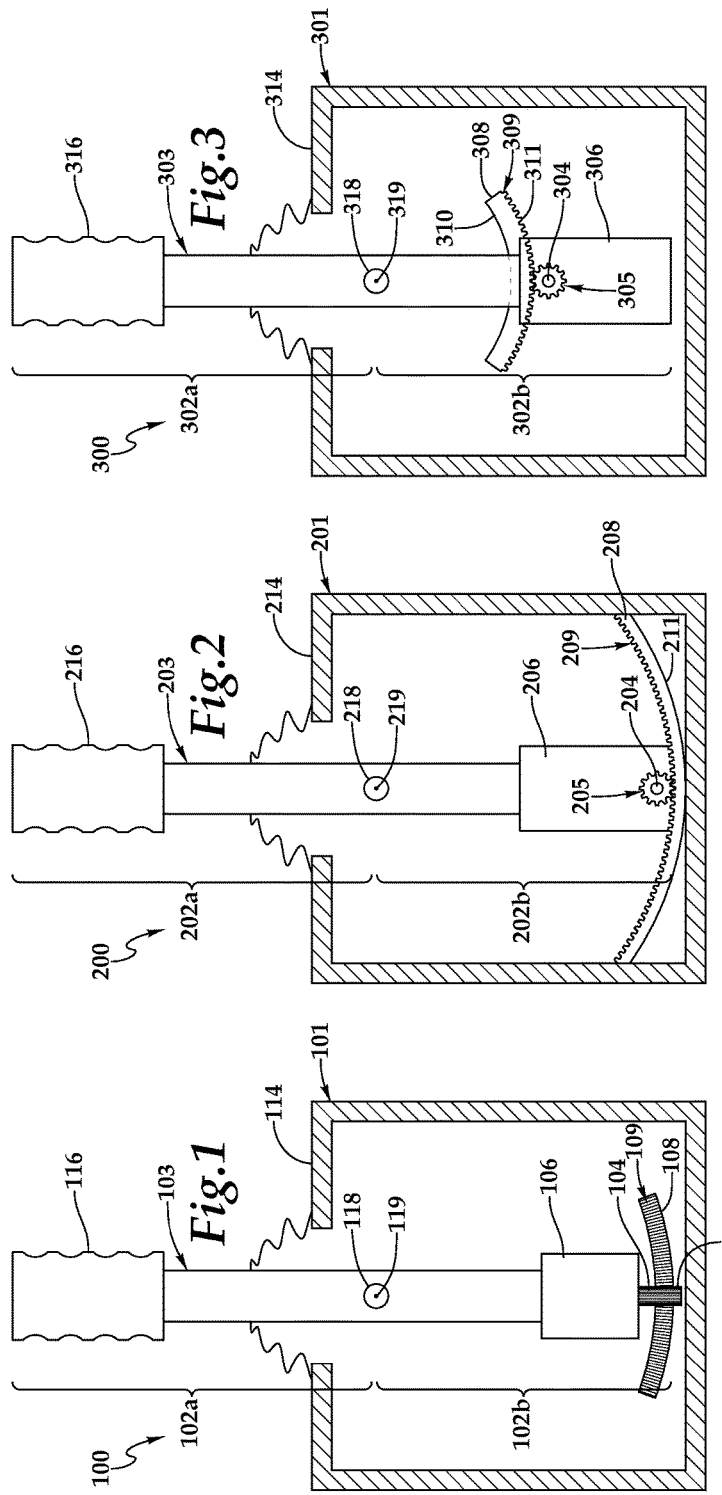
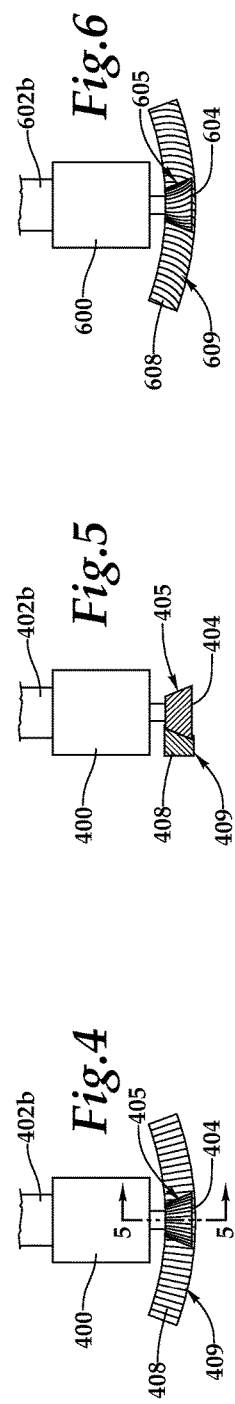

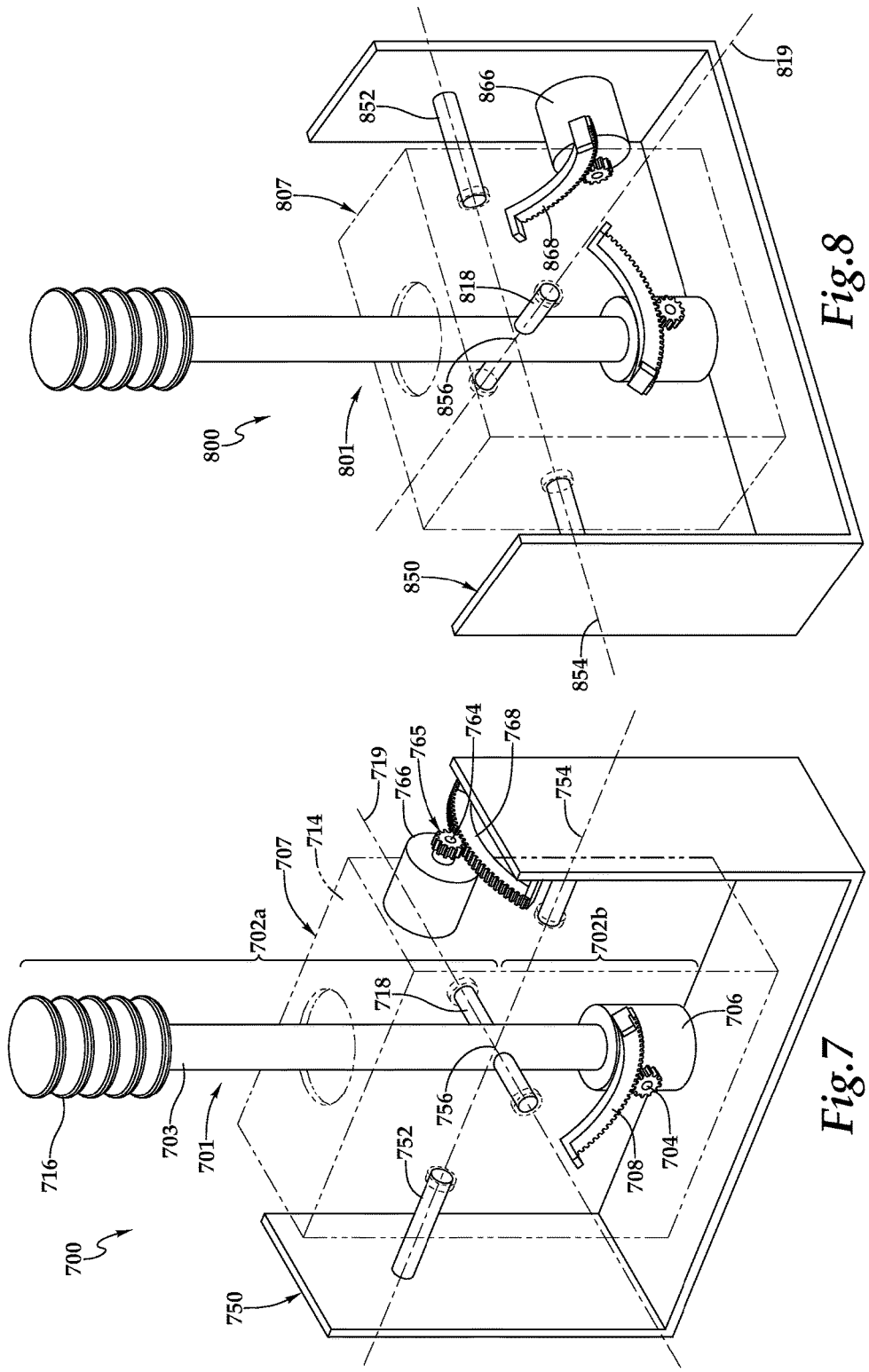

INHERENTLY BALANCED CONTROL STICK

TECHNICAL FIELD

This specification relates to mechanical input controls, and more particularly, aircraft flight controls.

BACKGROUND

Joystick input devices have been employed in a wide range of applications, from aircraft control to video game inputs. Joysticks may be provided to supply directional input information related to a single rotational axis, or to multiple axes. More sophisticated joystick instruments may provide magnitude data as well.

In operation, an operator will manually displace the joystick relative to one or more of its rotational axes in order to issue directional commands to other equipment. Sensors within the joystick will sense the angular displacement of the joystick and develop input signals accordingly, which may be transmitted to the equipment to be controlled. The sensors and the signals they produce may operate electronically, hydraulically, or otherwise.

In many applications it is desirable that the joystick return to a center or neutral position after it has been released by the operator. Many joysticks are designed to be displaced about two perpendicular axes, so that directional information may be detected through 360 degrees. Thus, in order to return the joystick to a center position on one or both axes, certain designs have included springs to provide a centering force relative to each axis. While these mechanisms can provide the desired centering functions, these return mechanisms also tend to add weight, complexity, and cost to the design of the joystick, and cause the joystick to be mass unbalanced and therefore more susceptible to the effects of acceleration, e.g., to resist movement of the stick by gravity, g-forces.

SUMMARY

In general, this document describes mechanical input controls, and more particularly, aircraft flight controls.

In a first aspect, a control apparatus includes a first mounting member, an elongate member having a first elongate portion, a second elongate portion, a first axis member between the first elongate portion and the second elongate portion, pivotally mounting the elongate member to the first mounting member and defining a first axis, a track configured as an arc defined about the first axis, and a first feedback assembly supported upon the second elongate portion and providing a first interface device configured to travel along the track in response to movement of the second elongate portion partly about the first axis, wherein the mass of the second elongate portion and the first feedback assembly substantially offsets the mass of the first elongate portion about the first axis member.

Various embodiments can include some, all, or none of the following features. The track can include a collection of gear teeth, and the first interface device can include a gear configured to engage the gear teeth such that the gear rotates in response to travel along the track. The gear can define a second axis that is radial to the first axis, the gear teeth can be arranged radial to the first axis, and the gear can engage the gear teeth perpendicular to the first axis. The gear can define a second axis that is parallel to the first axis, the track can have an outer surface radially distal from the first axis and an inner surface radially proximal to the first axis, and the collection of gear teeth can be arranged along the inner surface parallel to the first axis. The gear can define a second axis that is parallel to the first axis, the track can have an outer surface radially distal from the first axis and an inner surface radially proximal to the first axis, and the collection of gear teeth can be arranged along the outer surface parallel to the first axis. The feedback assembly can include a motor configured to drive the first interface device to modify travel of the actuator along the track to modify movement of the second elongate portion partly about the first axis. The first interface device can include a sensor configured to provide feedback in response to movement of the first interface device along the track. The upper elongate portion can include one or more user controls. The control apparatus can include a second mounting member, a second axis member between the first mounting member and the second mounting member, pivotally mounting the second mounting member to the first mounting member and defining a third axis perpendicular to and intersecting with the first axis, and a second feedback assembly having a second interface device and at least one of (1) a motor configured to drive the second interface device to modify travel of the actuator to modify movement of the second elongate portion partly about the third axis, and (2) a sensor configured to provide feedback in response to movement of the second elongate portion partly about the third axis.

In a second aspect, a method of actuating a control apparatus includes providing a control apparatus having a first mounting member, an elongate member having a first elongate portion, a second elongate portion, a first axis member between the first elongate portion and the second elongate portion pivotally mounting the elongate member to the first mounting member and defining a first axis, a track configured as an arc defined about the first axis, and a first feedback assembly supported upon the second elongate portion and providing a first interface device and a motor configured to urge travel of the interface along the track. The mass of the second elongate portion and the feedback assembly substantially offsets the mass of the first elongate portion about the axis member. The method also includes urging, by the first motor, travel of the first interface device, modifying, by the first interface device, a movement of the second elongate portion along the track, and modifying, by the movement of the second elongate portion along the track, a first torque developed about the first axis.

Various implementations can include some, all, or none of the following features. The method can include subjecting the elongate member to acceleration forces, wherein acceleration of the mass of the second elongate portion and the first feedback assembly substantially creates a torque about the first axis member that offsets a torque about the first axis member created by acceleration of the mass of the first elongate portion. The track can include a collection of gear teeth, and the first interface device can include a gear configured to engage the gear teeth such that the gear travels along the track in response to rotation of the motor. The gear can define a second axis that is radial to the first axis, the gear teeth can be arranged radial to the first axis, and the gear can engage the gear teeth perpendicular to the first axis. The gear can define a second axis that is parallel to the first axis, the track can have an outer surface radially distal from the first axis and an inner surface radially proximal to the first axis, and the collection of gear teeth can be arranged along the inner surface parallel to the first axis. The gear can define a second axis that is parallel to the first axis, the track can have an outer surface radially distal from the first axis and an inner surface radially proximal to the first axis, and the collection of gear teeth can be arranged along the outer surface parallel to the first axis. The control apparatus can include a second mounting member, a second axis member between the first mounting member and the second mounting member, pivotally mounting the second mounting member to the first mounting member and defining a third axis perpendicular to and intersecting with the first axis, and a second feedback assembly comprising a second interface device and a second motor configured to drive the second interface device to modify travel of the actuator to modify movement of the second elongate portion partly about the third axis, wherein the method can include urging, by the second motor, travel of the second interface device, modifying, by the second interface device, a movement of the second elongate portion about the third axis, and modifying a second torque developed about the third axis.

In a third aspect, a method of actuating a control apparatus includes providing a control apparatus having a first mounting member, an elongate member having a first elongate portion, a second elongate portion, a first axis member between the first elongate portion and the second elongate portion, pivotally mounting the elongate member to the first mounting member and defining a first axis, a track configured as an arc defined about the first axis, and a first feedback assembly supported upon the second elongate portion and providing a first interface device and a first sensor. The mass of the second elongate portion and the feedback assembly substantially offsets the mass of the first elongate portion about the axis member. The method also includes sensing, by the first sensor, at least one of (1) a first movement of the second elongate portion along the track and (2) a first torque developed about the first axis, and providing, by the first interface device, information descriptive of at least one of the movement and the first torque.

Various implementations can include some, all, or none of the following features. The method can include subjecting the elongate member to acceleration forces, wherein acceleration of the mass of the second elongate portion and the first feedback assembly substantially creates a torque about the first axis member that offsets a torque about the first axis member created by acceleration of the mass of the first elongate portion. The track can include a collection of gear teeth, and the first interface device can include a gear configured to engage the gear teeth such that the gear rotates as the gear travels along the track in response to user movement of the first elongate member. The control apparatus can include a second mounting member, a second axis member between the first mounting member and the second mounting member, pivotally mounting the second mounting member to the first mounting member and defining a third axis perpendicular to and intersecting with the first axis, and a second feedback assembly comprising a second interface device and a second sensor, wherein the method can include sensing, by the second sensor, at least one of (1) a second movement of the second elongate portion about the third axis and (2) a second torque developed about the third axis, and providing, by the second sensor, information descriptive of at least one of the second movement and the second torque.

The apparatus described herein may provide one or more of the following advantages. First, a control apparatus can provide a control stick having a self-centering capability. Second, the control apparatus can be substantially mass-balanced about an axis. Third, the control apparatus can be substantially neutral to forces of acceleration. Fourth, the control apparatus can be constructed with reduced size (e.g., envelope), weight, cost, and/or parts count.

The details of one or more implementations are set forth in the accompanying drawings and the description below. Other features and advantages will be apparent from the description and drawings, and from the claims.

DESCRIPTION OF DRAWINGS

FIGS. 1-3 are plan views of example active control sticks.

FIGS. 4 and 5 are plan and side views of an example feedback assembly.

FIG. 6 is a plan view of another example feedback assembly.

FIG. 7 is a perspective view of an example two-axis control stick.

FIG. 8 is a perspective view of another example two-axis control stick.

DETAILED DESCRIPTION

This document describes mechanical devices for accepting operator input, such as flight control sticks or side sticks used by aircraft pilots. In general, an aircraft or other machine may provide a "joystick" type side stick user control, and an operator may manipulate the stick to control the machine. For example, the operator may push, pull, move side to side, or otherwise manipulate a control stick to steer the machine. In general, some implementations may benefit from a control stick configuration that automatically returns to a default position after being displaced, or one that substantially maintains default position against gravity or other acceleration forces, e.g., g-forces.

Weight, cost, and size, are other considerations that may generally influence the selection of a control stick mechanism, especially for use in aircraft applications. Issues of weight, cost, and/or size considerations, however, may run counter to the inclusion of self-centering features which can add complexity to a control stick design, and still may not provide the aforementioned substantial neutrality to g-forces.

This document describes a control stick design that is substantially mass balanced about its axis to provide increased resistance to movement under acceleration. In general, the balanced nature of the control stick is accomplished by incorporating mechanical components used for providing self-centering and other functions into the movable mechanisms of the control stick itself in a design that balances the amount of mass included on each control of the control stick's axis points. In some implementations, by incorporating the mass of such mechanisms into the balance of the control stick, the control stick can provide increased neutrality to acceleration without using additional counter-weights, thereby providing increased neutrality without substantially increasing weight.

FIG. 1 is a plan view of an example active control stick 100. In some embodiments, the active control stick 100 can be provided as a side stick, a center stick, a control column, a control yoke, or any other appropriate adaptation of a lever control device. In the illustrated example, the active control stick 100 is shown in a substantially centered or default position.

The active control stick 100 includes an upper elongate portion 102a extending above a base plate 114 of a housing 101 and a lower elongate portion 102b extending below the base plate 114. In some embodiments, the housing 101 can be a mounting bracket or other mounting member, for example, for attachment of the active control stick 100 to an airframe, console, or other portion of an aircraft or other machine. The upper elongate portion 102a and the lower elongate portion 102b are two opposing radial sections of a rotary member 103, which rotates about an axis 118 located near the base plate 114 and defining an x-axis 119. Angular displacement of the upper elongate portion 102a causes a similar angular displacement in the lower elongate portion 102b.

The upper elongate member 102a includes a grip assembly 116. The grip assembly 116 extends radially away from the axis 118. In use, a user manipulates the grip assembly 116 to cause the example active control stick 100 to rotate about the x-axis 119. In some embodiments, the grip assembly 116 may be formed for manipulation by a user. For example, the grip assembly 116 may be sized and contoured to fit the hand of a pilot or other machine operator.

With regard to the example active control stick 100, a track 108 is supported by the housing 101. The track 108 is configured as an arc at least partly defined about the x-axis 119. The lower elongate portion 102b includes a feedback assembly 106 and an interface device 104. The interface device 104 is configured to travel along the track 108 in response to movement of the lower elongate portion 102b partly about the axis 118.

The interface device 104 is configured as a spur gear extending from the feedback assembly 106 parallel to the lower elongate portion 102b. In this configuration, the interface device 104 defines an axis that remains substantially radial to the x-axis 119 as the lower elongate portion 102b moves. The interface device 104 includes a collection of radial gear teeth 105 with faces extending the axial length of the spur gear.

The track 108 includes a collection of gear teeth 109. The gear teeth 109 are arranged upon the track 108 such that the face of each tooth is oriented to be substantially radial to the x-axis 119. The radial gear teeth 105 meshingly engage with the gear teeth 109. In some implementations, the interface device 104 can be rotated to urge movement of the lower elongate portion 102b along the track 108 and urge the rotary member 103 to pivot about the axis 118 (e.g., force feedback). In some implementations, the interface device 104 can be held rotationally stationary to resist movement of the lower elongate portion 102b along the track 108 and resist pivotal movement of the rotary member 103 about the axis 118 in response to external forces acting upon the upper elongate portion 102a (e.g., position hold, clutching). For example, the feedback assembly 106 may include a motor and/or clutch configured to controllably spin the interface device 104 and/or prevent rotation of the interface device 104, and provide force feedback to the user hand at the grip 116.

In some implementations, the interface device 104 can be rotated in response to the rotary member 103 pivoting about the axis 118, causing movement of the lower elongate portion 102b along the track 108 (e.g., position sensing). For example, the feedback assembly 106 may include a rotary encoder or other sensor configured to measure rotation of the interface device 104 and provide position feedback to a controller or other receiving device as the user urges movement at the grip 116.

With regard to the example active control stick 100, the upper elongate portion 102a and the lower elongate portion 102b are formed so the mass of the upper elongate portion 102a and the mass of the lower elongate portion 102b are substantially balanced across the axis 118. In some implementations, the mass of the upper elongate portion 102a may be equal to the mass of the lower elongate portion 102b, with their respective masses being distributed substantially symmetrically about the x-axis 119. In some implementations, the mass of the upper elongate portion 102a may be equal or unequal to the mass of the lower elongate portion 102b, with their respective masses being distributed substantially asymmetrically about the x-axis 119. For example, the upper elongate portion 102a may include relatively lightweight components located to create a relatively long lever arm, e.g., distance between the components and the fulcrum, and the lower elongate portion 102b may include relatively heavier components located to create a relatively shorter lever arm. As such, unequal masses and/or unequal lever lengths may be combined to substantially balance the distribution of the active control stick 100 about the x-axis 119.

FIG. 2 is a plan view of an example active control stick 200. In some embodiments, the active control stick 200 can be provided as a side stick, a center stick, a control column, a control yoke, or any other appropriate adaptation of a lever control device. In the illustrated example, the active control stick 200 is shown in a substantially centered or default position. The active control stick 200 includes an upper elongate portion 202a extending above a base plate 214 of a housing 201 and a lower elongate portion 202b extending below the base plate 214. The upper elongate portion 202a and the lower elongate portion 202b are two opposing radial sections of a rotary member 203, which rotates about an axis 218 located near the base plate 214 and defining an x-axis 219. Angular displacement of the upper elongate portion 202a causes a similar angular displacement in the lower elongate portion 202b.

The upper elongate member 202a includes a grip assembly 216. The grip assembly 216 extends radially away from the axis 218. In use, a user manipulates the grip assembly 216 to cause the example active control stick 200 to rotate about the x-axis 219. In some embodiments, the grip assembly 216 may be formed for manipulation by a user. For example, the grip assembly 216 may be sized and contoured to fit the hand of a pilot or other machine operator.

With regard to the example active control stick 200, a track 208 is supported by the housing 201. The track 208 is configured as an arc at least partly defined about the x-axis 219. The lower elongate portion 202b includes a feedback assembly 206 and an interface device 204. The interface device 204 is configured to travel along the track 208 in response to movement of the lower elongate portion 202b partly about the axis 218.

The interface device 204 is configured as a spur gear extending from the feedback assembly 206 perpendicular to the lower elongate portion 202b. In this configuration, the interface device 204 defines an axis that remains substantially parallel to the x-axis 219 as the lower elongate portion 202b moves. The interface device 204 includes a collection of radial gear teeth 205 with faces extending the axial length of the spur gear.

The track 208 includes a collection of gear teeth 209. The gear teeth 209 are arranged upon an inner surface 210 of the track 208, radially proximal to the axis 218 and opposite a radially outer surface 211. The face of each tooth is oriented substantially parallel to the x-axis 219 and extends from the inner surface radially toward the axis 218. The radial gear teeth 205 meshingly engage with the gear teeth 209. In some implementations, the interface device 204 can be rotated to urge movement of the lower elongate portion 202b along the track 208 and urge the rotary member 203 to pivot about the axis 218 (e.g., force feedback). In some implementations, the interface device 204 can be held rotationally stationary to resist movement of the lower elongate portion 202b along the track 208 and resist pivotal movement of the rotary member 203 about the axis 218 in response to external forces acting upon the upper elongate portion 202a (e.g., position hold, clutching). For example, the feedback assembly 206 may include a motor and/or clutch configured to controllably spin the interface device 204 and/or prevent rotation of the interface device 204, and provide force feedback to the user hand at the grip 216.

In some implementations, the interface device 204 can be rotated in response to the rotary member 203 pivoting about the axis 218, causing movement of the lower elongate portion 202b along the track 208 (e.g., position sensing). For example, the feedback assembly 206 may include a rotary encoder or other sensor configured to measure rotation of the interface device 204 and provide position feedback to a controller or other receiving device as the user urges movement at the grip 216.

With regard to the example active control stick 200, the upper elongate portion 202a and the lower elongate portion 202b are formed so the mass of the upper elongate portion 202a and the mass of the lower elongate portion 202b are substantially balanced across the axis 218. In some implementations, the mass of the upper elongate portion 202a may be equal to the mass of the lower elongate portion 202b, with their respective masses being distributed substantially symmetrically about the x-axis 219. In some implementations, the mass of the upper elongate portion 202a may be equal or unequal to the mass of the lower elongate portion 202b, with their respective masses being distributed substantially asymmetrically about the x-axis 219. For example, the upper elongate portion 202a may include relatively lightweight components located to create a relatively long lever arm, e.g., distance between the components and the fulcrum, and the lower elongate portion 202b may include relatively heavier components located to create a relatively shorter lever arm. As such, unequal masses and/or unequal lever lengths may be combined to substantially balance the distribution of the active control stick 200 about the x-axis 219.

In some embodiments, the interface device 204 and the track 208 may be configured to engage frictionally (e.g., direct contact without gears). For example, the interface device 204 may be a wheel with a rubberized outer surface, and the track 208 may be mostly smooth but with sufficient roughness to engage with the wheel to allow the wheel to roll along the track 208 to drive movement of the rotary member 203, or to allow movement of the rotary member 203 to drive rotation of the wheel as it is rolled along the track 208.

FIG. 3 is a plan view of an example active control stick 300. In some embodiments, the active control stick 300 can be provided as a side stick, a center stick, a control column, a control yoke, or any other appropriate adaptation of a lever control device. In the illustrated example, the active control stick 300 is shown in a substantially centered or default position. The active control stick 300 includes an upper elongate portion 302a extending above a base plate 314 of a housing 301 and a lower elongate portion 302b extending below the base plate 314. The upper elongate portion 302a and the lower elongate portion 302b are two opposing radial sections of a rotary member 303, which rotates about an axis 318 located near the base plate 314 and defining an x-axis 319. Angular displacement of the upper elongate portion 302a causes a similar angular displacement in the lower elongate portion 302b.

The upper elongate member 302a includes a grip assembly 316. The grip assembly 316 extends radially away from the axis 318. In use, a user manipulates the grip assembly 316 to cause the example active control stick 300 to rotate about the x-axis 319. In some embodiments, the grip assembly 316 may be formed for manipulation by a user. For example, the grip assembly 316 may be sized and contoured to fit the hand of a pilot or other machine operator.

With regard to the example active control stick 300, a track 308 is supported by the housing 301. The track 308 is configured as an arc at least partly defined about the x-axis 319. The lower elongate portion 302b includes a feedback assembly 306 and an interface device 304. The interface device 304 is configured to travel along the track 308 in response to movement of the lower elongate portion 302b partly about the axis 318.

The interface device 304 is configured as a spur gear extending from the feedback assembly 306 perpendicular to the lower elongate portion 302b. In this configuration, the interface device 304 defines an axis that remains substantially parallel to the x-axis 319 as the lower elongate portion 302b moves. The interface device 304 includes a collection of radial gear teeth 305 with faces extending the axial length of the spur gear.

The track 308 includes a collection of gear teeth 309. The gear teeth 309 are arranged upon an outer surface 311 of the track 308, radially distal from the axis 318 and opposite a radially outer surface 310. The face of each tooth is oriented substantially parallel to the x-axis 319 and extends from the inner surface radially toward the axis 318. The radial gear teeth 305 meshingly engage with the gear teeth 309. In some implementations, the interface device 304 can be rotated to urge movement of the lower elongate portion 302b along the track 308 and urge the rotary member 303 to pivot about the axis 318 (e.g., force feedback). In some implementations, the interface device 304 can be held rotationally stationary to resist movement of the lower elongate portion 302b along the track 308 and resist pivotal movement of the rotary member 303 about the axis 318 in response to external forces acting upon the upper elongate portion 302a (e.g., position hold, clutching). For example, the feedback assembly 306 may include a motor and/or clutch configured to controllably spin the interface device 304 and/or prevent rotation of the interface device 304, and provide force feedback to the user hand at the grip 316.

In some implementations, the interface device 304 can be rotated in response to the rotary member 303 pivoting about the axis 318, causing movement of the lower elongate portion 302b along the track 308 (e.g., position sensing). For example, the feedback assembly 306 may include a rotary encoder or other sensor configured to measure rotation of the interface device 304 and provide position feedback to a controller or other receiving device as the user urges movement at the grip 316.

With regard to the example active control stick 300, the upper elongate portion 302a and the lower elongate portion 302b are formed so the mass of the upper elongate portion 302a and the mass of the lower elongate portion 302b are substantially balanced across the axis 318. In some implementations, the mass of the upper elongate portion 302a may be equal to the mass of the lower elongate portion 302b, with their respective masses being distributed substantially symmetrically about the x-axis 319. In some implementations, the mass of the upper elongate portion 302a may be equal or unequal to the mass of the lower elongate portion 302b, with their respective masses being distributed substantially asymmetrically about the x-axis 319. For example, the upper elongate portion 302a may include relatively lightweight components located to create a relatively long lever arm, e.g., distance between the components and the fulcrum, and the lower elongate portion 302b may include relatively heavier components located to create a relatively shorter lever arm. As such, unequal masses and/or unequal lever lengths may be combined to substantially balance the distribution of the active control stick 300 about the x-axis 319.

In some embodiments, the mounting positions of the interface device 304 and the track 308 may be reversed. For example, the interface device 304 may be supported by the housing 301 and the track 308 may be supported by and move along with the lower elongate portion 302b.

In some embodiments, the interface device 304 and the track 308 may be configured to engage frictionally (e.g., direct contact without gears). For example, the interface device 304 may be a wheel with a rubberized outer surface, and the track 308 may be mostly smooth but with sufficient roughness to engage with the wheel to allow the wheel to roll along the track 308 to drive movement of the rotary member 303, or to allow movement of the rotary member 303 to drive rotation of the wheel as it is rolled along the track 308.

FIGS. 4 and 5 are plan and side views of an example feedback assembly 400. In some embodiments, the feedback assembly 400 can be used as the feedback assembly 106, 206, and 306 of the example active control sticks 100, 200, and 300.

The feedback assembly 400 includes an interface device 404. The interface device 404 is configured as a straight bevel gear extending from the feedback assembly 400 parallel to a lower elongate portion 402b. In this configuration, the interface device 404 defines an axis that remains substantially radial to the axis of rotation (e.g., the x-axis 119) of the lower elongate portion 402b. The interface device 404 includes a collection of gear teeth 405 with faces extending substantially straight and substantially parallel to the generators of the cone of the straight bevel gear.

The gear teeth 405 interface with a track 408. In some embodiments, the track 408 can be supported by a housing. For example, the track 408 can be used in place of the track 108, which is supported upon the housing 101 of the example active control stick 100. The track 408 is configured as an arc at least partly defined about the axis of the lower elongate portion 402b. The track 408 includes a collection of gear teeth 409. The gear teeth 409 are arranged upon the track 408 such that the face of each tooth is oriented at an angle that is between 0 and 90 degrees relative to the axis of the lower elongate portion 402b. The radial gear teeth 405 meshingly engage with the gear teeth 409. In some embodiments, the track 408 may be a subsection of a straight bevel gear configured to matingly interface with the straight bevel gear configuration of the interface device 404.

The interface device 404 is configured to travel along the track 408 in response to movement of the lower elongate portion 402b partly about the axis of the lower elongate portion 402b. In some implementations, the interface device 404 can be rotated to urge movement of the lower elongate portion 402b along the track 408 and urge pivotal motion of a rotary member (e.g., the rotary member 103). For example, the interface device 404 may be driven to provide force feedback to an operator. In some implementations, the interface device 404 can be held rotationally stationary to resist movement of the lower elongate portion 402b along the track 408 and resist pivotal movement of a rotary member in response to external forces acting upon an upper elongate portion (e.g., the upper elongate portion 102a). For example, rotation of the interface device 404 may be prevented in order to provide a position hold or clutching behavior for an active control stick, such as the example active control stick 100. For example, the feedback assembly 106 may include a motor and/or clutch configured to controllably spin the interface device 104 and/or prevent rotation of the interface device 104, and provide force feedback to the user hand at the grip 116.

In some implementations, the interface device 104 can be rotated in response to the rotary member 103 pivoting about the axis 118, causing movement of the lower elongate portion 102b along the track 108 (e.g., position sensing). For example, the feedback assembly 106 may include a rotary encoder or other sensor configured to measure rotation of the interface device 104 and provide position feedback to a controller or other receiving device as the user urges movement at the grip 116.

FIG. 6 is a plan view of another example feedback assembly 600. In some embodiments, the feedback assembly 600 can be used as the feedback assembly 106, 206, and 306 of the example active control sticks 100, 200, and 300.

The feedback assembly 600 includes an interface device 604. The interface device 604 is configured as a spiral bevel gear extending from the feedback assembly 600 parallel to a lower elongate portion 602b. In this configuration, the interface device 604 defines an axis that remains substantially radial to the axis of rotation (e.g., the x-axis 119) of the lower elongate portion 602b. The interface device 604 includes a collection of gear teeth 605 that are curved to the generators of the cone of the spiral bevel gear.

The gear teeth 605 interface with a track 608. In some embodiments, the track 608 can be supported by a housing. For example, the track 608 can be used in place of the track 108, which is supported upon the housing 101 of the example active control stick 100. The track 608 is configured as an arc at least partly defined about the axis of the lower elongate portion 602b. The track 608 includes a collection of gear teeth 609. The gear teeth 609 are arranged upon the track 608 such that the face of each tooth is oriented at an angle that is between 0 and 90 degrees relative to the axis of the lower elongate portion 602b. The radial gear teeth 605 meshingly engage with the gear teeth 609. In some embodiments, the track 608 may be a subsection of a spiral bevel gear configured to matingly interface with the straight bevel gear configuration of the interface device 604. In some embodiments, the interface device 604 and the track 608 may be configured to interface as zerol bevel gears, hypoid bevel gears, mitre gears, or as any other appropriate form of gears.

FIG. 7 is a perspective view of an example two-axis active control stick 700. In some embodiments, the active control stick 700 can be provided as a side stick, a center stick, a control column, a control yoke, or any other appropriate adaptation of a lever control device. In the illustrated example, the two-axis active control stick 700 is shown in a substantially centered or default position. The two-axis active control stick 700 includes a one-axis active control stick assembly 701 having an upper elongate portion 702a extending above a base plate 714 and an axis 718 of an inner housing 707, and a lower elongate portion 702b extending below the axis 718. The upper elongate portion 702a and the lower elongate portion 702b are two opposing radial sections of a rotary member 703, which rotates about the axis 718 and defines an x-axis 719. Angular displacement of the upper elongate portion 702a causes a similar angular displacement in the lower elongate portion 702b.

The upper elongate member 702a includes a grip assembly 716. The grip assembly 716 extends radially away from the axis 718. In some embodiments, the grip assembly 716 may be formed for manipulation by a user. For example, the grip assembly 716 may be sized and contoured to fit the hand of a pilot or other machine operator.

With regard to the example two-axis active control stick 700, a track 708 is supported by the inner housing 707. The track 708 is configured as an arc at least partly defined about the x-axis 719. The lower elongate portion 702b includes a feedback assembly 706 and an interface device 704. The interface device 704 is configured to travel along the track 708 in response to movement of the lower elongate portion 702b partly about the axis 718.

The rotary member 703 is substantially mass-balanced about the x-axis 719. In some embodiments, the example one-axis active control stick 701 can be the example active control stick 100, the example active control stick 200, or the example active control stick 300. In general, the two-axis control stick 700 extends the design of the active control sticks 100, 200, and 300 to provide a second axis of motion (e.g., y-axis) while remaining substantially mass-balanced about both axes.

The inner housing 707 is also configured as a mounting bracket for attachment to an outer housing 750. The inner housing 707 is pivotally connected to the outer housing 750 by an axis 752 defining a y-axis 754. The y-axis 754 is substantially perpendicular to the x-axis 719 and intersects with the x-axis 719 at an origin point 756. In some embodiments, the outer housing 750 is configured as a mounting bracket or other mounting member, for example, for attachment of the example two-axis active control stick 700 to an airframe, console, or other portion of an aircraft or other machine.

With regard to the example two-axis active control stick 700, a track 768 is supported by the outer housing 750. The track 768 is configured as an arc at least partly defined about the y-axis 754. The inner housing 707 supports a feedback assembly 766 and an interface device 764. The interface device 764 is configured to travel along the track 768 in response to movement of the lower elongate portion 702b partly about the axis 752. In some embodiments, the track 768 may be supported by the inner housing 707 and the feedback assembly 766 can be supported by the outer housing 750.

The interface device 764 is configured as a spur gear extending from the feedback assembly 766 substantially parallel to the axis 752. In this configuration, the interface device 764 defines an axis that remains substantially parallel to the y-axis 754 as the lower elongate portion 702b moves. The interface device 764 includes a collection of radial gear teeth 765 with faces extending the axial length of the spur gear.

The track 768 includes a collection of gear teeth 769. The gear teeth 769 are arranged upon the track 768 such that the face of each tooth is oriented substantially radial to the y-axis 754. The radial gear teeth 765 meshingly engage with the gear teeth 769. In some implementations, the interface device 766 can be rotated to urge movement of the inner housing 707 along the track 7688 and urge the rotary member 703 to pivot about the axis 752 (e.g., force feedback). In some implementations, the interface device 766 can be held rotationally stationary to resist movement of the inner housing 707 along the track 768 and resist pivotal movement of the rotary member 103 about the axis 752 in response to external forces acting upon the upper elongate portion 702a (e.g., position hold, clutching). For example, the feedback assembly 766 may include a motor and/or clutch configured to controllably spin the interface device 764 and/or prevent rotation of the interface device 764, and provide force feedback to the user hand at the grip 716.

With regard to the example two-axis active control stick 700, the upper elongate portion 702a and the lower elongate portion 702b are configured so the mass of the upper elongate portion 702a and the mass of the lower elongate portion 702b are substantially balanced across the axis 718. The inner housing 707 and the one-axis control stick 701 are configured to be substantially balanced across the axis 752. In some implementations, the mass of inner housing 707 and the one-axis control stick 701 may be distributed substantially symmetrically about the origin 756. In some implementations, the mass of the inner housing 707 and the one-axis control stick 701 may be distributed equally or unequally across the origin 756, with their respective masses being distributed substantially asymmetrically about the origin 756. For example, a portion of the inner housing 707 above the origin 756 may include relatively lightweight components located to create a relatively long lever arm, e.g., distance between the components and the fulcrum, and the portion of the inner housing 707 below the origin 756 may include relatively heavier components located to create a relatively shorter lever arm. As such, unequal masses and/or unequal lever lengths may be combined to substantially balance the distribution of the two-axis active control stick 700 about both the x-axis 719 and the y-axis 754.

FIG. 8 is a perspective view of another example two-axis active control stick 800. In some embodiments, the two-axis active control stick 800 can be provided as a side stick, a center stick, a control column, a control yoke, or any other appropriate adaptation of a lever control device. In the illustrated example, the two-axis active control stick 800 is shown in a substantially centered or default position. The two-axis active control stick 800 includes a one-axis active control stick assembly 801. In general, the two-axis control stick 800 is the example two-axis control stick 700 with the feedback assembly 706 and the track 708 in an alternate configuration.

The one-axis control stick assembly 701 is substantially mass balanced about an axis 818 defining an x-axis 819. The one-axis control stick assembly 801 includes an inner housing 807, which supports a track 868 and is pivotally coupled to an outer housing 850 by an axis 852 defining a y-axis 854. The y-axis 854 is substantially perpendicular to the x-axis 819 and intersects with the x-axis 819 at an origin point 856. In some embodiments, the outer housing 850 is configured as a mounting bracket or other mounting member, for example, for attachment of the example two-axis active control stick 800 to an airframe, console, or other portion of an aircraft or other machine.

In some embodiments, the track 868 can be the track 768 modified to be mounted upon the inner housing 807 instead of the outer housing 750, and below the y-axis 854 instead of above the y-axis 754. The outer housing 850 supports a feedback assembly 866. In some embodiments the feedback assembly 866 can be the feedback assembly 766 modified to be supported by the outer housing 850 instead of the inner housing 707, and below the y-axis 854 instead of above the y-axis 754.

The inner housing 807 and the one-axis control stick 801 are configured to be substantially balanced across the axis 852. In some implementations, the mass of inner housing 807 and the one-axis control stick 801 may be distributed substantially symmetrically about the origin 856. In some implementations, the mass of the inner housing 807 and the one-axis control stick 801 may be distributed equally or unequally across the origin 856, with their respective masses being distributed substantially asymmetrically about the origin 856. For example, a portion of the inner housing 807 above the origin 856 may include relatively lightweight components located to create a relatively long lever arm, e.g., distance between the components and the fulcrum, and the portion of the inner housing 807 below the origin 856 may include relatively heavier components located to create a relatively shorter lever arm. As such, unequal masses and/or unequal lever lengths may be combined to substantially balance the distribution of the two-axis active control stick 800 about both the x-axis 819 and the y-axis 854.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A control apparatus comprising:
   a first mounting member;
   an elongate member comprising:
      a first elongate portion configured as a first lever arm having a first mass;
      a second elongate portion comprising a first feedback assembly having a first interface device, and configured as a second lever arm having a second mass; and
      a first axis member between the first elongate portion and the second elongate portion, pivotally mounting the elongate member to the first mounting member and defining a first axis between the first lever arm and the second lever arm; and
   a track configured as an arc defined about the first axis wherein the first interface device is configured to travel along the track in response to movement of the second elongate portion partly about the first axis;
   wherein the first elongate portion and the second elongate portion are substantially balanced across the first axis, the first mass substantially offsets the second mass across the first axis member, and the mass of the first elongate portion is arranged to create, when exposed to acceleration forces, a first torque about the first axis that substantially neutralizes a second torque created about the first axis when the second elongate portion and the first feedback assembly is exposed to the acceleration forces.

2. The control apparatus of claim 1, wherein the track comprises a collection of gear teeth, and the first interface device includes a gear configured to engage the gear teeth such that the gear rotates about an interface axis in response to travel along the track.

3. The control apparatus of claim 2, wherein the gear teeth are arranged radial to the first axis, and the gear engages the gear teeth such that the interface axis is arranged substantially perpendicular to the first axis.

4. The control apparatus of claim 2, wherein the track has an outer surface radially distal from the first axis and an inner surface radially proximal to the first axis, and the collection of gear teeth are arranged along the inner surface such that the interface axis is arranged substantially parallel to the first axis.

5. The control apparatus of claim 2, wherein the track has an outer surface radially distal from the first axis and an inner surface radially proximal to the first axis, and the collection of gear teeth are arranged along the outer surface such that the interface axis is arranged substantially parallel to the first axis.

6. The control apparatus of claim 1, wherein the feedback assembly comprises a motor configured to drive the first interface device to modify travel of the actuator along the track to modify movement of the second elongate portion partly about the first axis.

7. The control apparatus of claim 1, wherein the first interface device comprises a sensor configured to provide feedback in response to movement of the first interface device along the track.

8. The control apparatus of claim 1, wherein the upper elongate portion further comprises one or more user controls.

9. The control apparatus of claim 1, further comprising:
   a second mounting member;
   a second axis member between the first mounting member and the second mounting member, pivotally mounting the second mounting member to the first mounting member and defining a third axis perpendicular to and intersecting with the first axis; and
   a second feedback assembly comprising a second interface device and at least one of (1) a motor configured to drive the second interface device to modify travel of the actuator to modify movement of the second elongate portion partly about the third axis, and (2) a sensor configured to provide feedback in response to movement of the second elongate portion partly about the third axis.

* * * * *